US009443367B2

(12) United States Patent
Baltazor

(10) Patent No.: US 9,443,367 B2
(45) Date of Patent: Sep. 13, 2016

(54) DIGITAL IMAGE COIN DISCRIMINATION FOR USE WITH CONSUMER-OPERATED KIOSKS AND THE LIKE

(71) Applicant: Outerwall Inc., Bellevue, WA (US)

(72) Inventor: Steven Baltazor, Black Diamond, WA (US)

(73) Assignee: Outerwall Inc., Bellevue, WA (US)

( * ) Notice: Subject to any disclaimer, the term of this patent is extended or adjusted under 35 U.S.C. 154(b) by 247 days.

(21) Appl. No.: 14/158,514

(22) Filed: Jan. 17, 2014

(65) Prior Publication Data

US 2015/0206369 A1 Jul. 23, 2015

(51) Int. Cl.
*G06K 9/00* (2006.01)
*G07D 5/00* (2006.01)
*G07D 5/02* (2006.01)

(52) U.S. Cl.
CPC ................ *G07D 5/005* (2013.01); *G07D 5/02* (2013.01)

(58) Field of Classification Search
None
See application file for complete search history.

(56) References Cited

U.S. PATENT DOCUMENTS

| | | | |
|---|---|---|---|
| 446,303 | A | 2/1891 | Thompson |
| 1,010,993 | A | 12/1911 | White |
| 1,234,707 | A | 7/1917 | Whistler |
| 1,711,049 | A | 4/1929 | Fonda et al. |
| 1,813,296 | A | 7/1931 | Kidwell |
| 1,847,940 | A | 3/1932 | Giles |
| 1,945,948 | A | 2/1934 | Morin |
| 2,014,505 | A | 9/1935 | Patche |
| 2,317,351 | A | 4/1943 | Andalikiewicz et al. |
| 2,390,147 | A | 12/1945 | Hatton |
| 2,461,314 | A | 2/1949 | Davis et al. |

(Continued)

FOREIGN PATENT DOCUMENTS

| | | | |
|---|---|---|---|
| AU | 695403 | B2 | 8/1998 |
| AU | 714452 | B2 | 1/2000 |

(Continued)

OTHER PUBLICATIONS

"Covariance Matrix," Wikipedia, [Online], Dec. 7, 2012 at 01:03 [Retrieved Aug. 7, 2013], Retrieved from the Internet: URL: http://en.wikipedia.org/w/index.php?title=Covariance_matrix&oldid=526797194, 5 pages.

(Continued)

*Primary Examiner* — Stephen R Koziol
*Assistant Examiner* — Sean Conner
(74) *Attorney, Agent, or Firm* — Perkins Coie LLP

(57) ABSTRACT

Systems and associated methods for coin discrimination are disclosed herein. Disclosed methods for discriminating coins include recognizing strings of alphanumerical characters of the coin using Optical Character Recognition (OCR). The methods can include recognizing colors and/or reflectivity of the coin using, for example, pixel thresholding algorithms. The methods can further include adding a line to an image of the coin, and measuring angles between the line and the edges on the coin. The methods can also include generating a rectangular image of the coin using, for example, a log-polar transform, generating a series of, for example, Fourier transforms from the rectangular image, and identifying spectral peak locations and intensities in the Fourier transform results. The results of the OCR, color/reflectivity recognition, angle measurement, spectral peak location, spectral peak intensity of the coin and/or other features or aspects of coins can then be compared to known values for different coins to discriminate the coins.

15 Claims, 9 Drawing Sheets

(56) References Cited

U.S. PATENT DOCUMENTS 2,569,360 A 9/1951 Weingart
2,621,665 A 12/1952 McGee
2,644,470 A 7/1953 Labbe
2,856,561 A 12/1958 Rosapepe
2,881,774 A 4/1959 Labbe
2,960,377 A 1/1960 Simjian
2,931,480 A 4/1960 Heim
3,009,555 A 11/1961 Seckula, Sr.
3,048,251 A 8/1962 Bower
3,056,132 A 9/1962 Simjian
3,065,467 A 11/1962 Prevost
3,132,654 A 5/1964 Adams
3,173,742 A 3/1965 Simjian
3,196,257 A 7/1965 Buchholtz et al.
3,286,805 A 11/1966 New
3,297,242 A 1/1967 Karp
3,396,737 A 8/1968 Picollo
3,415,348 A 12/1968 Wahlberg
3,463,171 A 8/1969 Dolman
3,589,492 A 6/1971 Shirley
3,599,771 A 8/1971 Hinterstocker et al.
3,603,327 A 9/1971 Buchholz et al.
3,653,481 A 4/1972 Boxall et al.
3,752,168 A 8/1973 Bayha
3,763,871 A 10/1973 Jobst et al.
3,788,440 A 1/1974 Propice et al.
3,791,574 A 2/1974 Picquot et al.
3,797,307 A 3/1974 Johnston
3,815,717 A 6/1974 Arseneau
3,818,918 A 6/1974 Nissmo et al.
3,870,137 A 3/1975 Fougere
3,901,368 A 8/1975 Klinger
3,941,226 A 3/1976 Drakes
3,948,280 A 4/1976 Dahl et al.
3,952,851 A 4/1976 Fougere et al.
3,960,293 A 6/1976 Sweet, II et al.
3,965,912 A 6/1976 Gross et al.
3,969,584 A 7/1976 Miller et al.
3,982,620 A 9/1976 Kortenhaus
3,984,660 A 10/1976 Oka et al.
3,998,237 A 12/1976 Kressin et al.
4,014,424 A 3/1977 Hall
4,036,242 A 7/1977 Breitenstein et al.
4,058,954 A 11/1977 Asami et al.
4,059,122 A 11/1977 Kinoshita
4,071,740 A 1/1978 Gogulski
4,089,400 A 5/1978 Gregory, Jr.
4,092,990 A 6/1978 Bayne
4,099,722 A 7/1978 Rodesch et al.
4,100,925 A 7/1978 Fukunaga et al.
4,106,610 A 8/1978 Heiman
4,111,216 A 9/1978 Brisebarre et al.
4,124,109 A 11/1978 Bissell et al.
4,141,372 A 2/1979 Gdanski et al.
4,148,331 A 4/1979 Nicolaus
4,167,949 A 9/1979 Hashimoto et al.
4,199,744 A 4/1980 Aldridge et al.
4,225,056 A 9/1980 Flubacker
4,228,811 A 10/1980 Tanaka et al.
4,230,213 A 10/1980 Spring
4,249,552 A 2/1981 Margolin et al.
4,266,121 A 5/1981 Hirose et al.
4,275,751 A 6/1981 Bergman
4,286,704 A 9/1981 Wood et al.
4,306,644 A 12/1981 Rockola et al.
4,321,672 A 3/1982 Braun et al.
4,326,620 A 4/1982 Felix et al.
4,334,604 A 6/1982 Davies
4,346,798 A 8/1982 Agey, III
4,356,829 A 11/1982 Furuya et al.
4,360,034 A 11/1982 Davila et al.
4,369,442 A 1/1983 Werth et al.
4,369,800 A 1/1983 Watanabe et al.
4,374,557 A 2/1983 Sugimoto et al.
4,376,442 A 3/1983 Gomez et al.
4,380,316 A 4/1983 Glinka et al.
4,383,540 A 5/1983 De Meyer et al.
4,398,550 A 8/1983 Shireman
4,412,292 A 10/1983 Sedam et al.
4,412,607 A 11/1983 Collins et al.
4,416,365 A 11/1983 Heiman
4,434,359 A 2/1984 Watanabe et al.
4,436,103 A 3/1984 Dick
4,437,558 A 3/1984 Nicholson et al.
4,442,850 A 4/1984 Austin et al.
4,447,714 A 5/1984 Lundblad et al.
4,448,297 A 5/1984 Mendelsohn
4,460,003 A 7/1984 Barnes et al.
4,469,213 A 9/1984 Nicholson et al.
4,488,116 A 12/1984 Plesko
4,503,963 A 3/1985 Steiner
4,504,357 A 3/1985 Holbein et al.
4,506,685 A 3/1985 Childers et al.
4,509,122 A 4/1985 Agnew et al.
4,509,542 A 4/1985 Watanabe et al.
4,509,633 A 4/1985 Chow
4,538,719 A 9/1985 Gray et al.
4,542,817 A 9/1985 Paulson
4,543,969 A 10/1985 Rasmussen
4,554,446 A 11/1985 Murphy et al.
4,555,618 A 11/1985 Riskin
4,558,711 A 12/1985 Ikuta Yoshiaki et al.
4,558,712 A 12/1985 Sentoku et al.
4,574,824 A 3/1986 Paulsen et al.
4,577,744 A 3/1986 Doucet et al.
4,587,984 A 5/1986 Levasseur et al.
4,597,487 A 7/1986 Crosby et al.
4,598,378 A 7/1986 Giacomo
4,611,205 A 9/1986 Eglise et al.
4,616,323 A 10/1986 Hayashi
4,616,776 A 10/1986 Blumenthal et al.
4,620,559 A 11/1986 Childers et al.
4,622,456 A 11/1986 Naruto et al.
4,625,851 A 12/1986 Johnson et al.
4,641,239 A 2/1987 Takesako
4,667,093 A 5/1987 MacDonald et al.
4,672,377 A 6/1987 Murphy et al.
4,674,055 A 6/1987 Ogaki et al.
4,677,565 A 6/1987 Ogaki et al.
4,694,845 A 9/1987 Zay
4,706,577 A 11/1987 Jones et al.
4,706,795 A 11/1987 Mikami et al.
4,716,799 A 1/1988 Hartmann
4,723,212 A 2/1988 Mindrum et al.
4,733,765 A 3/1988 Watanabe
4,753,625 A 6/1988 Okada et al.
4,767,917 A 8/1988 Ushikubo
4,775,353 A 10/1988 Childers et al.
4,775,354 A 10/1988 Rasmussen et al.
4,809,837 A 3/1989 Hayashi et al.
4,809,838 A 3/1989 Houserman
4,814,589 A 3/1989 Storch et al.
4,831,374 A 5/1989 Masel
4,833,308 A 5/1989 Humble
4,836,352 A 6/1989 Tateno et al.
4,842,119 A 6/1989 Abe et al.
4,872,618 A 10/1989 Sato et al.
4,882,675 A 11/1989 Nichtberger et al.
4,883,158 A 11/1989 Kobayashi et al.
4,884,672 A 12/1989 Parker
4,896,791 A 1/1990 Smith
4,898,564 A 2/1990 Gunn et al.
4,910,672 A 3/1990 Off et al.
4,914,381 A 4/1990 Narod et al.
4,915,205 A 4/1990 Reid et al.
4,921,463 A 5/1990 Primdahl et al.
4,926,997 A 5/1990 Parker
4,936,435 A 6/1990 Griner
4,936,436 A 6/1990 Keltner
4,950,986 A 8/1990 Guerrero
4,953,086 A 8/1990 Fukatsu et al.
4,959,624 A 9/1990 Higgins, Jr. et al.
4,963,118 A 10/1990 Gunn et al.
4,964,495 A 10/1990 Rasmussen

(56) References Cited

U.S. PATENT DOCUMENTS 4,969,549 A 11/1990 Eglise et al.
4,977,502 A 12/1990 Baker et al.
4,978,322 A 12/1990 Paulsen
4,995,497 A 2/1991 Kai et al.
4,995,848 A 2/1991 Goh et al.
4,997,406 A 3/1991 Horiguchi et al.
5,010,238 A 4/1991 Kadono et al.
5,021,967 A 6/1991 Smith
5,022,889 A 6/1991 Ristvedt et al.
5,025,139 A 6/1991 Halliburton, Jr.
5,027,937 A 7/1991 Parish et al.
5,030,165 A 7/1991 Nilsson et al.
5,039,848 A 8/1991 Stoken
5,040,657 A 8/1991 Gunn et al.
5,042,635 A 8/1991 Bell
5,055,657 A 10/1991 Miller et al.
5,056,644 A 10/1991 Parker
5,067,604 A 11/1991 Metcalf
5,073,767 A 12/1991 Holmes et al.
5,078,252 A 1/1992 Furuya et al.
5,083,765 A 1/1992 Kringel
5,083,814 A 1/1992 Guinta et al.
5,088,587 A 2/1992 Goodrich et al.
5,091,713 A 2/1992 Horne et al.
5,098,339 A 3/1992 Dabrowski
5,098,340 A 3/1992 Abe
5,100,367 A 3/1992 Abe et al.
5,111,927 A 5/1992 Schulze, Jr.
5,114,381 A 5/1992 Ueda et al.
5,135,433 A 8/1992 Watanabe et al.
5,145,046 A 9/1992 Satoh et al.
5,158,166 A 10/1992 Barson et al.
5,163,868 A 11/1992 Adams et al.
5,173,851 A 12/1992 Off et al.
5,174,608 A 12/1992 Benardelli et al.
5,183,142 A 2/1993 Latchinian et al.
5,191,957 A 3/1993 Hayes et al.
5,195,626 A 3/1993 Le Hong et al.
5,199,545 A 4/1993 Takamisawa et al.
5,201,396 A 4/1993 Chalabian et al.
5,217,100 A 6/1993 Thompson et al.
5,219,059 A 6/1993 Furuya et al.
5,220,614 A 6/1993 Crain
5,226,519 A 7/1993 DeWoolfson
5,226,520 A 7/1993 Parker
5,227,874 A 7/1993 Von Kohorn
5,227,966 A 7/1993 Ichiba
5,236,074 A 8/1993 Gotaas et al.
5,236,339 A 8/1993 Nishiumi et al.
5,244,070 A 9/1993 Carmen et al.
5,251,738 A 10/1993 Dabrowski
5,252,811 A 10/1993 Henochowicz et al.
5,254,032 A 10/1993 Abe et al.
5,263,566 A 11/1993 Nara et al.
5,279,404 A 1/1994 Bruner et al.
5,285,883 A 2/1994 Le Hong et al.
5,291,782 A 3/1994 Taylor
5,293,979 A 3/1994 Levasseur
5,293,980 A 3/1994 Parker
5,293,981 A 3/1994 Abe et al.
5,299,673 A 4/1994 Wu
5,302,811 A 4/1994 Fukatsu et al.
5,316,120 A 5/1994 Ibarrola
5,316,517 A 5/1994 Chiba et al.
5,317,135 A 5/1994 Finocchio
5,321,242 A 6/1994 Heath, Jr.
5,323,891 A 6/1994 Waite et al.
5,330,041 A 7/1994 Dobbins et al.
5,346,049 A 9/1994 Nakajima et al.
5,350,906 A 9/1994 Brody et al.
5,351,798 A 10/1994 Hayes
5,355,988 A 10/1994 Shirasawa
5,365,046 A 11/1994 Haymann
5,374,814 A 12/1994 Kako et al.
5,379,875 A 1/1995 Shames et al.
5,379,876 A 1/1995 Hutton
5,386,901 A 2/1995 Ibarrola et al.
5,388,680 A 2/1995 Hird et al.
5,392,891 A 2/1995 Ferguson et al.
5,404,985 A 4/1995 Baughman
5,409,092 A 4/1995 Itako et al.
5,429,222 A 7/1995 Delay et al.
5,431,270 A 7/1995 Wohlrab et al.
5,433,310 A 7/1995 Bell
5,435,777 A 7/1995 Takatani et al.
5,439,089 A 8/1995 Parker
5,441,139 A 8/1995 Abe et al.
5,449,058 A 9/1995 Kotler et al.
5,452,785 A 9/1995 Iwamoto et al.
5,457,305 A 10/1995 Akel et al.
5,458,225 A 10/1995 Iwamoto et al.
5,460,256 A 10/1995 Levasseur
5,469,951 A 11/1995 Takemoto et al.
5,469,952 A 11/1995 Kershaw et al.
5,479,507 A 12/1995 Anderson
5,480,061 A 1/1996 Ellinger
5,483,363 A 1/1996 Holmes et al.
5,484,334 A 1/1996 Evdokimo
5,489,015 A 2/1996 Wood et al.
5,494,145 A 2/1996 Cohrs et al.
5,494,147 A 2/1996 Takahashi et al.
5,501,633 A 3/1996 Watkins et al.
5,503,262 A 4/1996 Baudat et al.
5,506,393 A 4/1996 Ziarno
5,513,738 A 5/1996 Hird et al.
5,515,960 A 5/1996 Wood et al.
5,522,491 A 6/1996 Baudat et al.
5,531,640 A 7/1996 Inoue
5,535,872 A 7/1996 Smith et al.
5,554,070 A 9/1996 Takatoshi et al.
5,555,497 A 9/1996 Helbling
5,560,467 A 10/1996 Takemoto
5,564,546 A 10/1996 Molbak et al.
5,573,099 A 11/1996 Church et al.
5,577,959 A 11/1996 Takemoto et al.
5,579,887 A 12/1996 Leibu et al.
5,616,074 A 4/1997 Chen et al.
5,620,079 A 4/1997 Molbak
5,637,845 A 6/1997 Kolls
5,650,604 A 7/1997 Marcous et al.
5,652,421 A 7/1997 Veeneman et al.
5,665,952 A 9/1997 Ziarno
5,679,070 A 10/1997 Ishida et al.
5,687,830 A 11/1997 Hayes et al.
5,695,395 A 12/1997 Ota et al.
5,696,908 A 12/1997 Muehlberger et al.
5,697,484 A 12/1997 Yeh
5,699,328 A 12/1997 Ishizaki et al.
5,715,926 A 2/1998 Furneaux et al.
5,732,398 A 3/1998 Tagawa
5,743,429 A 4/1998 Morofsky
5,745,706 A 4/1998 Wolfberg et al.
5,746,299 A 5/1998 Molbak et al.
5,746,322 A 5/1998 LaVeine et al.
5,788,046 A 8/1998 Lamah et al.
5,799,767 A 9/1998 Molbak
5,799,768 A 9/1998 Bernier et al.
5,806,651 A 9/1998 Carmen et al.
5,839,956 A 11/1998 Takemoto et al.
5,842,916 A 12/1998 Gerrity et al.
5,868,236 A 2/1999 Rademacher
5,880,444 A 3/1999 Shibata et al.
5,901,828 A 5/1999 Monie et al.
5,909,792 A 6/1999 Gerlier et al.
5,909,793 A 6/1999 Beach et al.
5,909,794 A 6/1999 Molbak et al.
5,931,277 A 8/1999 Allan et al.
5,936,541 A 8/1999 Stambler
5,974,146 A 10/1999 Randle et al.
5,975,276 A 11/1999 Yeh
5,988,345 A 11/1999 Bergeron et al.
5,988,348 A 11/1999 Martin et al.
5,991,413 A 11/1999 Arditti et al.
5,995,927 A 11/1999 Li

(56) References Cited

U.S. PATENT DOCUMENTS

| | | | |
|---|---|---|---|
| 6,017,063 A | 1/2000 | Nilssen | |
| 6,021,883 A | 2/2000 | Casanova et al. | |
| 6,026,946 A | 2/2000 | McCarty, Jr. | |
| 6,047,807 A | 4/2000 | Molbak | |
| 6,047,808 A | 4/2000 | Neubarth et al. | |
| 6,053,300 A | 4/2000 | Wood et al. | |
| 6,053,807 A | 4/2000 | Metzger et al. | |
| 6,056,104 A | 5/2000 | Neubarth et al. | |
| 6,068,550 A | 5/2000 | Breitholtz et al. | |
| 6,071,187 A | 6/2000 | Knutsson et al. | |
| 6,093,094 A | 7/2000 | Uecker et al. | |
| 6,105,009 A | 8/2000 | Cuervo | |
| 6,110,044 A | 8/2000 | Stern | |
| 6,116,402 A | 9/2000 | Beach et al. | |
| 6,119,099 A | 9/2000 | Walker et al. | |
| 6,138,106 A | 10/2000 | Walker et al. | |
| 6,144,946 A | 11/2000 | Iwamura et al. | |
| 6,168,001 B1 | 1/2001 | Davis | |
| 6,174,230 B1 | 1/2001 | Gerrity et al. | |
| 6,179,703 B1 | 1/2001 | Knutsson et al. | |
| 6,185,545 B1 | 2/2001 | Resnick et al. | |
| 6,196,371 B1 | 3/2001 | Martin et al. | |
| 6,223,877 B1 | 5/2001 | McGinty et al. | |
| 6,223,878 B1 | 5/2001 | Cattani et al. | |
| 6,227,343 B1 | 5/2001 | Neathway et al. | |
| 6,230,928 B1 | 5/2001 | Hanna et al. | |
| 6,233,564 B1 | 5/2001 | Schulze, Jr. | |
| 6,250,453 B1 | 6/2001 | Furuya | |
| 6,253,179 B1 | 6/2001 | Beigi et al. | |
| 6,289,324 B1 | 9/2001 | Kawan | |
| 6,292,211 B1 | 9/2001 | Pena | |
| 6,293,385 B1 | 9/2001 | Hayashi et al. | |
| 6,311,820 B1 | 11/2001 | Hallas Bell et al. | |
| 6,318,536 B1 | 11/2001 | Korman et al. | |
| 6,349,972 B1 | 2/2002 | Geiger et al. | |
| 6,375,080 B1 | 4/2002 | Cremonese | |
| 6,398,001 B1 | 6/2002 | Hutchinson et al. | |
| 6,401,010 B1 | 6/2002 | Takahashi | |
| 6,404,090 B1 | 6/2002 | Phillips et al. | |
| 6,405,182 B1 | 6/2002 | Cuervo | |
| 6,415,262 B1 | 7/2002 | Walker et al. | |
| 6,471,030 B1 | 10/2002 | Neubarth et al. | |
| 6,484,863 B1 | 11/2002 | Molbak | |
| 6,484,864 B2 | 11/2002 | Sugata | |
| 6,484,884 B1 | 11/2002 | Gerrity et al. | |
| 6,494,776 B1 | 12/2002 | Molbak | |
| 6,505,774 B1 | 1/2003 | Fulcher et al. | |
| 6,520,308 B1 | 2/2003 | Martin et al. | |
| 6,536,037 B1 | 3/2003 | Guheen et al. | |
| 6,554,184 B1 | 4/2003 | Amos | |
| 6,607,063 B2 | 8/2003 | Kuwabara et al. | |
| 6,666,318 B2 | 12/2003 | Gerrity et al. | |
| 6,704,039 B2 | 3/2004 | Pena | |
| 6,705,448 B1 | 3/2004 | Steel et al. | |
| 6,736,251 B2 | 5/2004 | Molbak | |
| 6,739,444 B2 | 5/2004 | Baker et al. | |
| 6,758,316 B2 | 7/2004 | Molbak | |
| 6,761,257 B2 | 7/2004 | Karlsson | |
| 6,766,892 B2 | 7/2004 | Martin et al. | |
| 6,778,693 B2 | 8/2004 | Jones et al. | |
| 6,829,596 B1 | 12/2004 | Frazee | |
| 6,830,143 B2 | 12/2004 | King | |
| 6,854,581 B2 | 2/2005 | Molbak | |
| 6,863,168 B1 | 3/2005 | Gerrity et al. | |
| 6,886,680 B2 | 5/2005 | King | |
| 6,899,215 B2 | 5/2005 | Baudat et al. | |
| 6,902,049 B2 | 6/2005 | King | |
| 6,957,746 B2 | 10/2005 | Martin et al. | |
| 6,976,570 B2 | 12/2005 | Molbak | |
| 7,000,754 B2 | 2/2006 | Baudat et al. | |
| 7,014,029 B2 | 3/2006 | Winters | |
| 7,014,108 B2 | 3/2006 | Sorenson et al. | |
| 7,017,729 B2 | 3/2006 | Gerrity et al. | |
| 7,028,827 B1 | 4/2006 | Molbak et al. | |
| 7,044,285 B2 | 5/2006 | Takebayashi | |
| 7,073,652 B2 | 7/2006 | Baudat | |
| 7,113,929 B1 | 9/2006 | Beach et al. | |
| 7,131,580 B2 | 11/2006 | Molbak | |
| 7,152,727 B2 | 12/2006 | Waechter | |
| 7,198,157 B2 | 4/2007 | King et al. | |
| 7,209,582 B2 | 4/2007 | Takahashi | |
| 7,213,697 B2 | 5/2007 | Martin et al. | |
| 7,243,772 B2 | 7/2007 | Harris et al. | |
| 7,280,696 B2 | 10/2007 | Zakrzewski et al. | |
| 7,290,645 B2 | 11/2007 | Hill et al. | |
| 7,303,119 B2 | 12/2007 | Molbak | |
| 7,520,374 B2 | 4/2009 | Martin et al. | |
| 7,527,193 B2 | 5/2009 | Molbak | |
| 7,539,616 B2 | 5/2009 | Zhang et al. | |
| 7,549,526 B2 | 6/2009 | Ohtomo | |
| 7,552,810 B2 | 6/2009 | Mecklenburg | |
| 7,558,765 B2 | 7/2009 | Kiefer | |
| 7,584,833 B2 | 9/2009 | Howells | |
| 7,584,869 B2 | 9/2009 | DeLazzer et al. | |
| 7,646,894 B2 | 1/2010 | Yang et al. | |
| 7,653,599 B2 | 1/2010 | Doran et al. | |
| 7,708,130 B2 | 5/2010 | Meyer et al. | |
| 7,748,619 B2 | 7/2010 | Martin et al. | |
| 7,773,784 B2 | 8/2010 | Boult | |
| 7,815,071 B2 | 10/2010 | Martin et al. | |
| 7,865,432 B2 | 1/2011 | Doran et al. | |
| 7,874,478 B2 | 1/2011 | Molbak | |
| 7,971,699 B2 | 7/2011 | Molbak et al. | |
| 8,024,272 B2 | 9/2011 | Doran et al. | |
| 8,073,287 B1 | 12/2011 | Wechsler et al. | |
| 8,490,771 B2 | 7/2013 | Toji | |
| 8,517,161 B2 | 8/2013 | Baudat | |
| 8,550,227 B1 | 10/2013 | Martin | |
| 8,550,294 B2 | 10/2013 | Martin | |
| 8,611,665 B2 | 12/2013 | He et al. | |
| 8,668,069 B1 | 3/2014 | Everhart | |
| 8,739,955 B1 | 6/2014 | Everhart | |
| 8,899,401 B2 | 12/2014 | Everhart | |
| 2001/0008200 A1* | 7/2001 | Yoshida | G07D 5/005 194/318 |
| 2001/0013456 A1 | 8/2001 | Ishida et al. | |
| 2002/0005329 A1* | 1/2002 | Sugata | G07D 5/005 194/302 |
| 2002/0026423 A1 | 2/2002 | Maritzen et al. | |
| 2002/0074209 A1 | 6/2002 | Karlsson et al. | |
| 2003/0057054 A1 | 3/2003 | Waechter | |
| 2005/0045450 A1 | 3/2005 | Geib et al. | |
| 2007/0154078 A1 | 7/2007 | He et al. | |
| 2008/0205741 A1* | 8/2008 | Couronne | G07D 5/005 382/136 |
| 2009/0166151 A1 | 7/2009 | Martin et al. | |
| 2010/0054551 A1 | 3/2010 | Decoux | |
| 2010/0330892 A1 | 12/2010 | Nishida | |
| 2011/0195649 A1 | 8/2011 | Abe et al. | |
| 2013/0074322 A1 | 3/2013 | Maute | |
| 2013/0086973 A1 | 4/2013 | Martin et al. | |
| 2013/0202184 A1 | 8/2013 | Grove et al. | |
| 2013/0315437 A1* | 11/2013 | Kerschner | G06Q 30/018 382/100 |
| 2013/0322730 A1 | 12/2013 | Borg et al. | |
| 2015/0235107 A1 | 8/2015 | Borg et al. | |

FOREIGN PATENT DOCUMENTS

| | | | |
|---|---|---|---|
| AU | 753323 | B2 | 10/2002 |
| AU | 777507 | B2 | 10/2004 |
| AU | 2005200256 | A1 | 2/2005 |
| CA | 1053598 | | 5/1979 |
| CA | 2060630 | | 8/1992 |
| CA | 2067987 | | 11/1992 |
| CA | 2143943 | A1 | 3/1994 |
| CA | 2189330 | A1 | 11/1995 |
| CA | 2235925 | A1 | 11/1995 |
| CA | 2259234 | A1 | 1/1998 |
| CA | 2426411 | A1 | 1/1998 |
| CA | 2426462 | A1 | 1/1998 |
| CA | 2295129 | A1 | 1/1999 |
| CA | 2581740 | A1 | 1/1999 |
| CH | 680171 | | 6/1992 |

(56) References Cited

FOREIGN PATENT DOCUMENTS

| | | | |
|---|---|---|---|
| DE | 660354 | C | 5/1938 |
| DE | 1944488 | | 3/1971 |
| DE | 2516532 | | 10/1975 |
| DE | 2528735 | A1 | 4/1976 |
| DE | 2800494 | | 7/1979 |
| DE | 3021327 | A1 | 12/1981 |
| DE | 3147603 | | 6/1983 |
| DE | 288018 | A5 | 3/1991 |
| EP | 0060392 | A2 | 9/1982 |
| EP | 0076617 | A2 | 4/1983 |
| EP | 0091731 | | 10/1983 |
| EP | 0200873 | | 11/1986 |
| EP | 0200873 | A1 | 11/1986 |
| EP | 0209357 | | 1/1987 |
| EP | 0300781 | | 1/1989 |
| EP | 0304535 | | 3/1989 |
| EP | 0 351 217 | | 1/1990 |
| EP | 0420163 | A1 | 4/1991 |
| EP | 0477722 | | 4/1992 |
| EP | 0657855 | | 6/1995 |
| EP | 657855 | A1 | 6/1995 |
| EP | 0685826 | | 12/1995 |
| EP | 0710932 | A1 | 5/1996 |
| EP | 0724237 | | 7/1996 |
| EP | 0766859 | A1 | 4/1997 |
| EP | 0857579 | A2 | 8/1998 |
| EP | 0924662 | A2 | 6/1999 |
| EP | 0924664 | | 6/1999 |
| EP | 0924665 | A2 | 6/1999 |
| EP | 1178448 | | 2/2002 |
| EP | 1231579 | | 8/2002 |
| EP | 1646014 | A2 | 4/2006 |
| EP | 2045780 | A1 | 4/2009 |
| EP | 2360649 | A1 | 8/2011 |
| FR | 2042254 | A5 | 2/1971 |
| FR | 2342531 | A1 | 9/1977 |
| FR | 2845189 | | 4/2004 |
| GB | 958741 | | 5/1964 |
| GB | 1564723 | | 4/1980 |
| GB | 2095452 | | 9/1982 |
| GB | 2121582 | A | 12/1983 |
| GB | 2153128 | A | 8/1985 |
| GB | 2169429 | | 7/1986 |
| GB | 2175427 | A | 11/1986 |
| GB | 2186411 | A | 8/1987 |
| GB | 2188467 | | 9/1987 |
| GB | 2198274 | A | 6/1988 |
| GB | 2223340 | A | 4/1990 |
| GB | 2223872 | A | 4/1990 |
| GB | 2255666 | A | 11/1992 |
| GB | 2272319 | A | 5/1994 |
| GB | 2341710 | A | 3/2000 |
| GB | 2344446 | A | 6/2000 |
| GB | 2358271 | A | 7/2001 |
| GB | 2358272 | A | 7/2001 |
| GB | 2358273 | A | 7/2001 |
| JP | 53049497 | | 5/1978 |
| JP | 55-159467 | | 12/1980 |
| JP | 58-121491 | | 7/1983 |
| JP | 59-148709 | | 8/1984 |
| JP | 61-065572 | | 4/1986 |
| JP | 62-50876 | | 3/1987 |
| JP | 63-4390 | | 1/1988 |
| JP | 1258092 | A | 10/1989 |
| JP | 1307891 | A | 12/1989 |
| JP | 2081193 | | 3/1990 |
| JP | 392994 | | 4/1991 |
| JP | 3252795 | A | 11/1991 |
| JP | 4-67776 | | 6/1992 |
| JP | 4315288 | A | 11/1992 |
| JP | 4344995 | | 12/1992 |
| JP | H0512526 | A | 1/1993 |
| JP | 5249892 | A | 9/1993 |
| JP | 5250296 | A | 9/1993 |
| JP | 2000163587 | | 6/2000 |
| JP | 200351043 | | 9/2004 |
| JP | 2009-211207 | A | 9/2009 |
| JP | 2009294693 | | 12/2009 |
| JP | 2011248775 | A | 12/2011 |
| JP | 5-200364 | B2 | 6/2013 |
| JP | 5200364 | | 6/2013 |
| JP | 54-57921 | B2 | 4/2014 |
| KR | 10-2007-0106819 | | 11/2007 |
| MX | 9605331 | A | 12/1997 |
| NZ | 333535 | A | 8/2000 |
| SE | 44244 | | 9/1918 |
| SE | 44247 | | 9/1918 |
| SE | 50250 | | 11/1919 |
| SE | 8801851 | A | 11/1989 |
| WO | WO-8700102 | A1 | 1/1987 |
| WO | WO-8705729 | | 9/1987 |
| WO | WO-8800274 | A2 | 1/1988 |
| WO | WO-8800592 | A1 | 1/1988 |
| WO | WO-8808174 | | 10/1988 |
| WO | WO-8901209 | | 2/1989 |
| WO | WO-9100209 | A1 | 1/1991 |
| WO | WO-9302431 | | 2/1993 |
| WO | WO-9307846 | A1 | 4/1993 |
| WO | WO-9406101 | A1 | 3/1994 |
| WO | WO-9409440 | A1 | 4/1994 |
| WO | WO-9505356 | A1 | 2/1995 |
| WO | WO-95/30215 | | 11/1995 |
| WO | WO -96/30877 | | 10/1996 |
| WO | WO-97/33257 | | 9/1997 |
| WO | WO-9949423 | A1 | 9/1999 |
| WO | WO-9950785 | | 10/1999 |
| WO | WO-0010138 | | 2/2000 |
| WO | 2012145842 | A1 | 11/2012 |

OTHER PUBLICATIONS

"Definitions of Multivariate Statistics on the Web," Google [Online], 2006 [Retrieved Dec. 23, 2006], Retrieved from the Internet: URL: http://www.google.com/search?hl+en &q+define%3A+multivariate+statistics, 1 page.

"How to Interpret an Inverse Covariance or Precision Matrix?" CrossValidated, [Online] Posted Nov. 8, 2011 [Retrieved Aug. 7, 2013] Retrieved from the Internet: URL: http://stats.stackexchange.com/questions/10795/how-to-interpret-an-inverse-covariance-or-precision-matrix, 2 pages.

"The Electrical Engineering Handbook", 2nd Ed. Published by CRC Press and IEEE in 1997, Edited by Richard C. Dorf, pp. 23-31.

Accessories Brochure, Jun. 16, 2005, 3 pages.

Australian Patent Office, Examiner's First Report, May 11, 1999, Australian Application No. 71948/98, 2 pages.

Correspondence between Scan Coin and Coinstar, Jan. 7, 1992, 2 pages.

European Office Action for European Application No. 05025871.4, Mail Date Jun. 30, 2014, 5 pages.

Japanese Office Action for Japanese Application No. 2013-213549, Mail Date Aug. 11, 2014, 15 pages.

Reisert, Marco et al. "A Fast and Reliable Coin Recognition System," Pattern Recognition—Lecture Notes in Computer Science, vol. 4713, 2007, pp. 415-424.

SC4000 Coin Discriminating System, Including Perforated, Vibrating Coin Feeding and Cleaning Tray Assembly; On sale in the US by Scan Coin Since at least as early as Dec. 1994 (including photographs, drawings and parts lists) 92 pages.

Scan Coin 4000 Value Sorter, Operator's Instruction Manual, Jun. 1995, 56 pages.

Scan Coin AB, Jagershillgatan 26, S-213, 75 Malmo, Sweden, Technical Referens Manual, CDS Coin Deposit System, 1989, pp. 3-93, odd pages only.

Scan Coin World Newsletters, Scan Coin AB, Jagerhillgatan 26, S-213 75 Malmo, Sweden, 1988-1990, 12 pages.

Schindler, Konrad, "Geometry and Construction of Straight Lines in Log-polar Images," Computer Vision and Understanding, 103, 2006, pp. 196-207.

Schubert, Erhard et al. "A Vision Based Coin Inspection System," SPIE vol. 2908, 1996, pp. 86-96.

(56) References Cited

OTHER PUBLICATIONS

Sheehan, Michael, “Marriage of Convenience,” available at <http://www.kioskbusiness.com/NovDec01/articles/article4.html>, accessed May 19, 2003, 3 pages.
Simmons, B, “Inverse of a Matrix, Matrix Inverse, Multiplicative Inverse of a Matrix,” www.mathwords.com [Online], Aug. 27, 2012 [Retrieved Aug. 7, 2013], Retrieved from the Internet: URL: http://www.mathwords.com/i/inverse_of_a_matrix.htm, 2 pages.
Slide Changing Apparatus With Slide Jam Protection, Research Disclosure 30509, Sep. 1989, 3 pages.
Stapel, E, “Matrix Inversion: Finding the Inverse of a Matrix,” Purplemath [Online], 2003-2012 [Retrieved on Dec. 19, 2012], Retrieved from the Internet: URL: http://www.purplemath.com/modules/mtrxinvr.htm, 2 pages.
Super Branch Literature, Feb. 1992, 2 pages.
Svenska Penninglotteriet Documents, 1988, 70 pages.
Technical Manual, Cash Deposit System, Model CDS 600 & CDS 640, 1991, 46 pages.
Technical Specifications GBS9401 SB, Prior to Nov. 10, 2010, 24 pages.
Wennergren-Williams, “Who Wants a Computer Consultant Who Thinks the Same Way as Everyone Else?” Priab Prisma, vol. 1, 1989, 7 pages.
“Input Capture/Output Compare Combination in PIC24FJ64GB002 Problems,” Microchip.com [online], May 6, 2011, Retrieved from the Internet: URL: http://www.microchip.com/forums/m576742.aspx, 4 pages.
Hoffman, Douglas, “Test Automation Architectures: Planning for Test Automation,” Software Quality Methods, LLC, 1999, 8 pages.
International Search Report and Written Opinion for International Patent Application No. PCT/US2014/072517, Mail date Mar. 16, 2015, 12 pages.

* cited by examiner

*FIG. 7*
700
720
710
722
721
710
731
UNITED STATES OF AMERICA
PLURIBUS
UNUM
ONE DOLLAR

DIGITAL IMAGE COIN DISCRIMINATION FOR USE WITH CONSUMER-OPERATED KIOSKS AND THE LIKE

TECHNICAL FIELD

The present technology is generally related to the field of coin discrimination.

BACKGROUND

Various embodiments of consumer-operated coin counting kiosks are disclosed in, for example: U.S. Pat. Nos. 5,620,079, 6,494,776, 7,520,374, 7,584,869, 7,653,599, 7,748,619, 7,815,071, and 7,865,432; and U.S. patent application Ser. Nos. 12/758,677, 12/806,531, 61/364,360, 61/409,050, and Ser. No. 13/489,043; each of which is incorporated herein in its entirety by reference.

Many consumer-operated kiosks, vending machines, and other commercial sales/service/rental machines discriminate between different coin denominations based on the size, weight and/or electromagnetic properties of metal alloys in the coin. With some known technologies, a coin can be routed through an oscillating electromagnetic field that interacts with the coin. As the coin passes through the electromagnetic field, coin properties are sensed, such as changes in inductance (from which the diameter of the coin can be derived) or the quality factor related to the amount of energy dissipated (from which conductivity/metallurgy of the coin can be obtained). The results of the interaction can be collected and compared against a list of sizes and electromagnetic properties of known coins to determine the denomination of the coin. In other known technologies, a coin can be rolled along a predetermined path and the velocity of the coin or the time to reach a certain point along the path can be measured. By comparing the measured time or velocity against the corresponding values for known coins, the denomination of the coin can be determined.

However, many coins may have similar size, mass, metallurgy, and/or spectral properties. This is especially the case in markets which are proximate to multiple countries having different coin denominations. As a result, coin counting mistakes may occur due to the coin similarities, resulting in possible losses for consumer coin counting kiosk operators. Accordingly, it would be advantageous to provide robust coin discrimination systems and methods that would work reliably for coins having similar size, mass, metallurgy, and/or spectral properties.

DETAILED DESCRIPTION

Figure 1A:
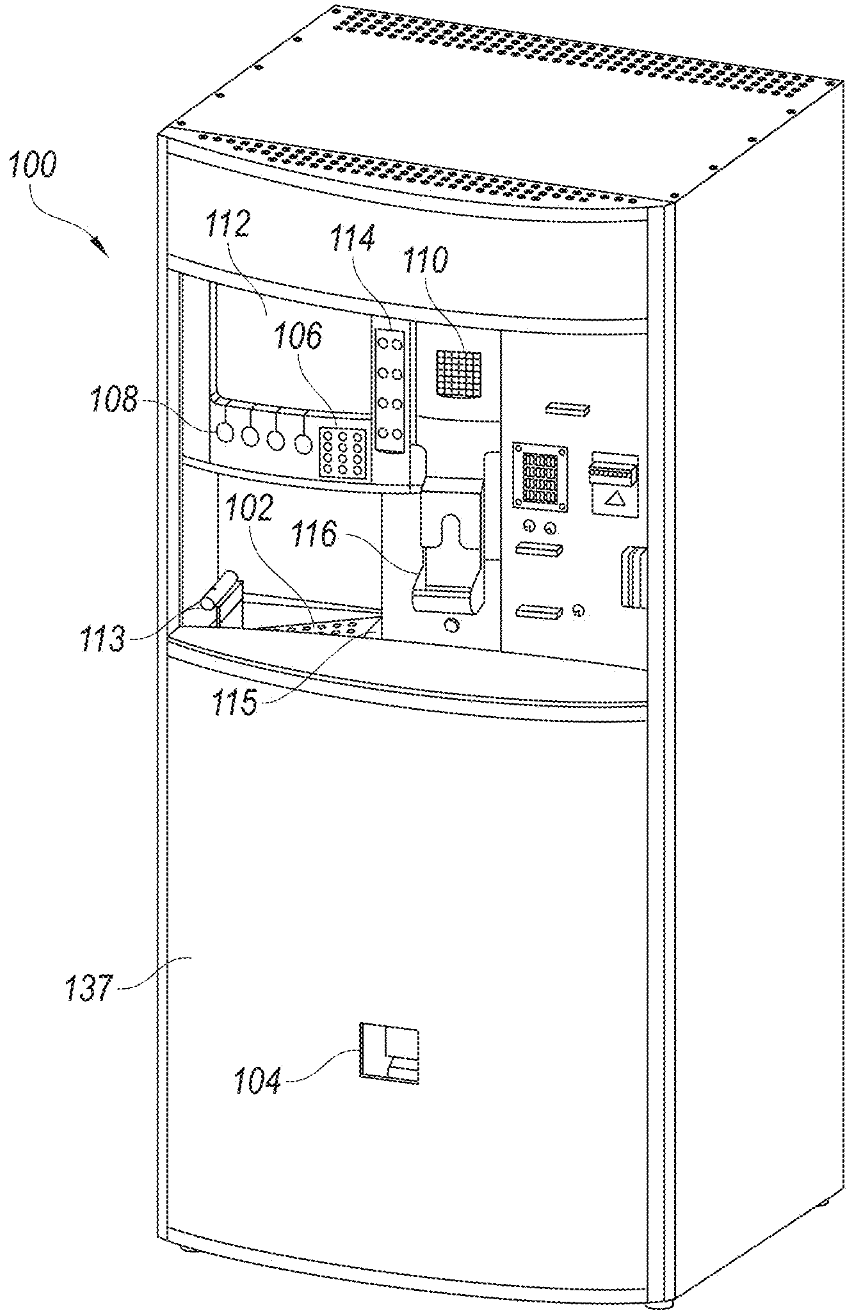
FIG. 1A is a front isometric view of a consumer-operated coin counting kiosk suitable for implementing embodiments of the present technology.

The following disclosure describes various embodiments of systems and associated methods for discriminating coin denominations based on optical properties of the coins. In some embodiments of the present technology, a consumer-operated kiosk (e.g., a consumer coin counting machine, prepaid card dispensing/reloading machine, etc.) includes one or more digital cameras that acquire digital images of a coin when the coin enters the viewfield of the The face, back side, and lateral edge of a typical coin includes numerous optical aspects that can be detected from the images and mapped to a suitable system (e.g., polar or rectangular coordinate system having an origin at a center the coin). Some examples of the optical aspects are alphanumerical characters, embossed images or parts of the images, dots around the edge, intersecting flat areas, and/or colors/shades of the coin. In some embodiments, the locations of the optical aspects of a coin can be compared to corresponding tabulated values for known coins in a relevant market to discriminate the coin. In some embodiments, angles between selected lines on the coin image can be used to discriminate the coins. Furthermore, distances between the optical aspects of coin (e.g., tip of George Washington's nose to letter "R" in the word "TRUST") be determined and used to discriminate the coins. In some embodiments, the embossed alphanumerical characters can be interpreted using computer implemented optical character recognition (OCR) to obtain true denomination of the coin. Additionally, a spectral analysis of the digital image of the coin can be performed to generate further discriminating aspects of the coins. For example, spectral analysis can be performed along different areas of the coin (e.g., at a given distance from a center of the coin). The obtained spectral peak can be compared to tabulated spectral values for the relevant coins in the market. Since a rectangular domain is generally better suited for spectral analysis than a round domain, the digital image of a round coin can be first mapped into a rectangular domain using, for example, a log-polar transform. The outline edge of the coin can be detected using line detection algorithms including, for example, Canny edge detection. Once the outline of the coin is determined, the diameter and the width of the coin can be calculated and used to discriminate the coins. Based on the discrimination results, the coin can be properly credited or rejected by the consumer-operated kiosk.

The following disclosure describes various embodiments of coin counting systems and associated methods of manufacture and use. Certain details are set forth in the following description and FIGS. 1A-8B to provide a thorough understanding of various embodiments of the disclosure. Other details describing well-known structures and systems often associated with coin counting machines, however, are not set forth below to avoid unnecessarily obscuring the description of the various embodiments of the disclosure. Many of the details and aspects shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and aspects illustrated in the Figures may not be drawn to scale.

FIG. 1A is an isometric view of a consumer coin counting machine 100 having a coin discrimination system configured in accordance with an embodiment of the present disclosure. In the illustrated embodiment, the coin counting machine 100 includes a coin input region or tray 102 and a coin return 104. The tray 102 includes a lift handle 113 for moving the coins into the machine 100 through an opening 115. The machine 100 further includes various user-interface devices, such as a keypad 106, user-selection buttons 108, a speaker 110, a display screen 112, a touch screen 114, and a voucher outlet 116. In other embodiments, the machine 100 can have other features in other arrangements including, for example, a card reader, a card dispenser, etc. Additionally, the machine 100 can include various indicia, signs, displays, advertisements and the like on its external surfaces. The machine 100 and various portions, aspects and features thereof can be at least generally similar in structure and function to one or more of the machines described in U.S. Pat. No. 7,520,374, U.S. Pat. No. 7,865,432, U.S. Pat. No. 7,874,478, U.S. patent application Ser. No. 13/489,043, U.S. patent application Ser. No. 13/691,047, and/or U.S. patent application Ser. No. 13/793,827 each of which is incorporated herein by reference in its entirety.

Figure 1B:
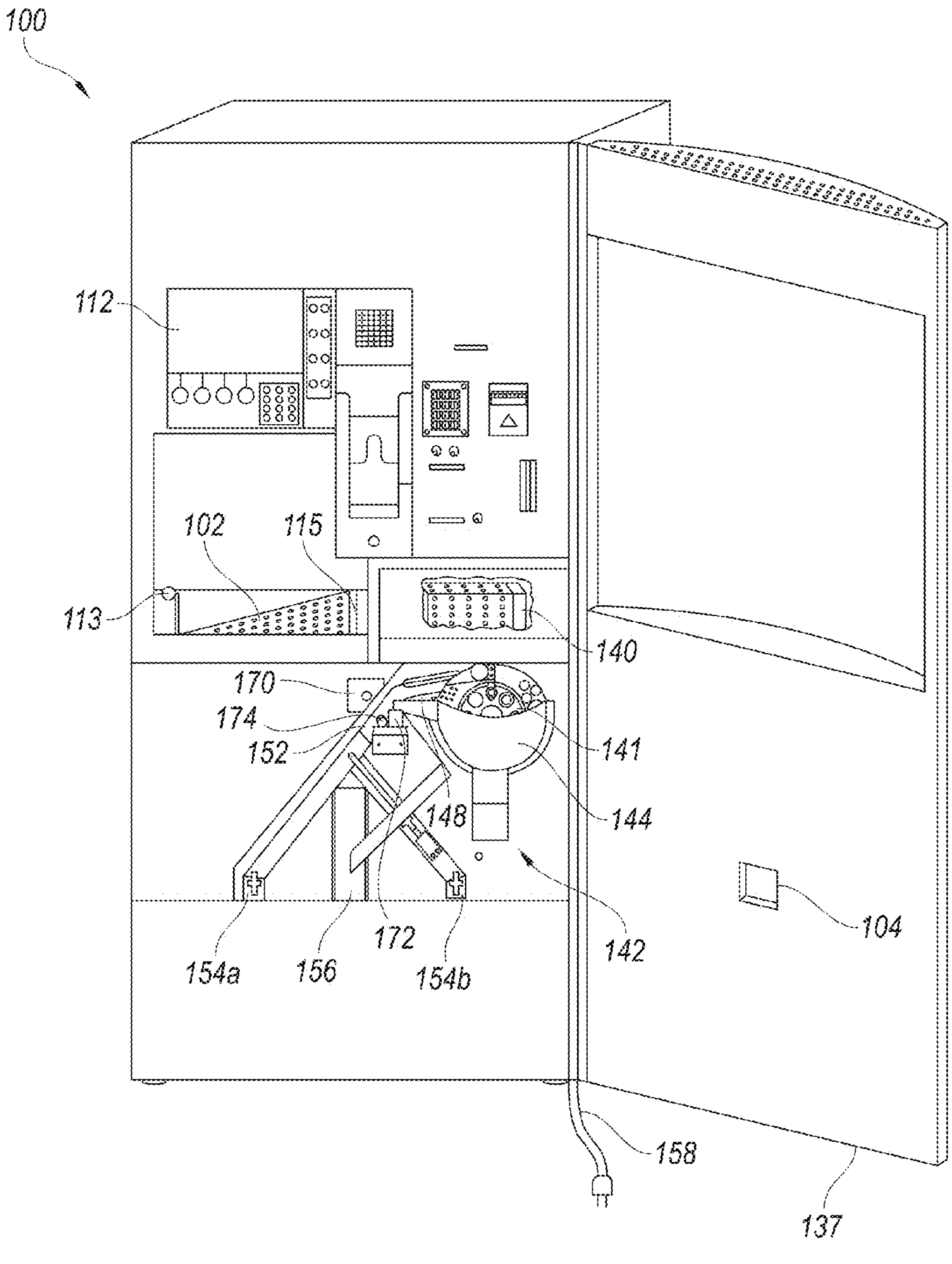
FIG. 1B is a front isometric view of the consumer-operated coin counting kiosk of FIG. 1A with a front door opened to illustrate a portion of the kiosk interior.

FIG. 1B is a partially cutaway isometric view of an interior portion of the machine 100. The machine 100 includes a door 137 that can rotate to an open position as shown. In the open position, most or all of the components of the machine 100 are accessible for cleaning and/or maintenance. In the illustrated embodiment, the machine 100 includes a coin cleaning portion (e.g., a rotating drum on trommel 140) and a coin counting portion 142. As described in more detail below, coins that are deposited into the tray 102 are directed through the trommel 140, and then to the coin counting portion 142. The coin counting portion 142 can include a coin rail 148 that receives coins from a coin hopper 144 via a coin pickup assembly 141. A power cord 158 can provide facility power to the machine 100.

In operation of this embodiment, a user places a batch of coins, typically of a plurality of denominations (and potentially accompanied by dirt or other non-coin objects and/or foreign or otherwise non-acceptable coins) in the input tray 102. The user is prompted by instructions on the display screen 112 to push a button indicating that the user wishes to have the batch of coins discriminated. An input gate (not shown) opens and a signal prompts the user to begin feeding coins into the machine by lifting the handle 113 to pivot the tray 102, and/or manually feeding coins through the opening 115. Instructions on the screen 112 may be used to tell the user to continue or discontinue feeding coins, to relay the status of the machine 100, the amount of coins counted thus far, and/or to provide encouragement, advertising, or other messages.

One or more chutes (not shown) direct the deposited coins and/or foreign objects from the tray 102 to the trommel 140. The trommel 140 in the depicted embodiment is a rotatably mounted container having a perforated-wall. A motor (not shown) rotates the trommel 140 about its longitudinal axis. As the trommel rotates, one or more vanes protruding into the interior of the trommel 140 assist in moving the coins in a direction towards an output region. An output chute (not shown) directs the (at least partially) cleaned coins exiting the trommel 140 toward the coin hopper 144. Trajectory of the coins through coin tubes 154*a-b* and return chute 156 is described in more detail with reference to FIG. 2 below.

Figure 2:
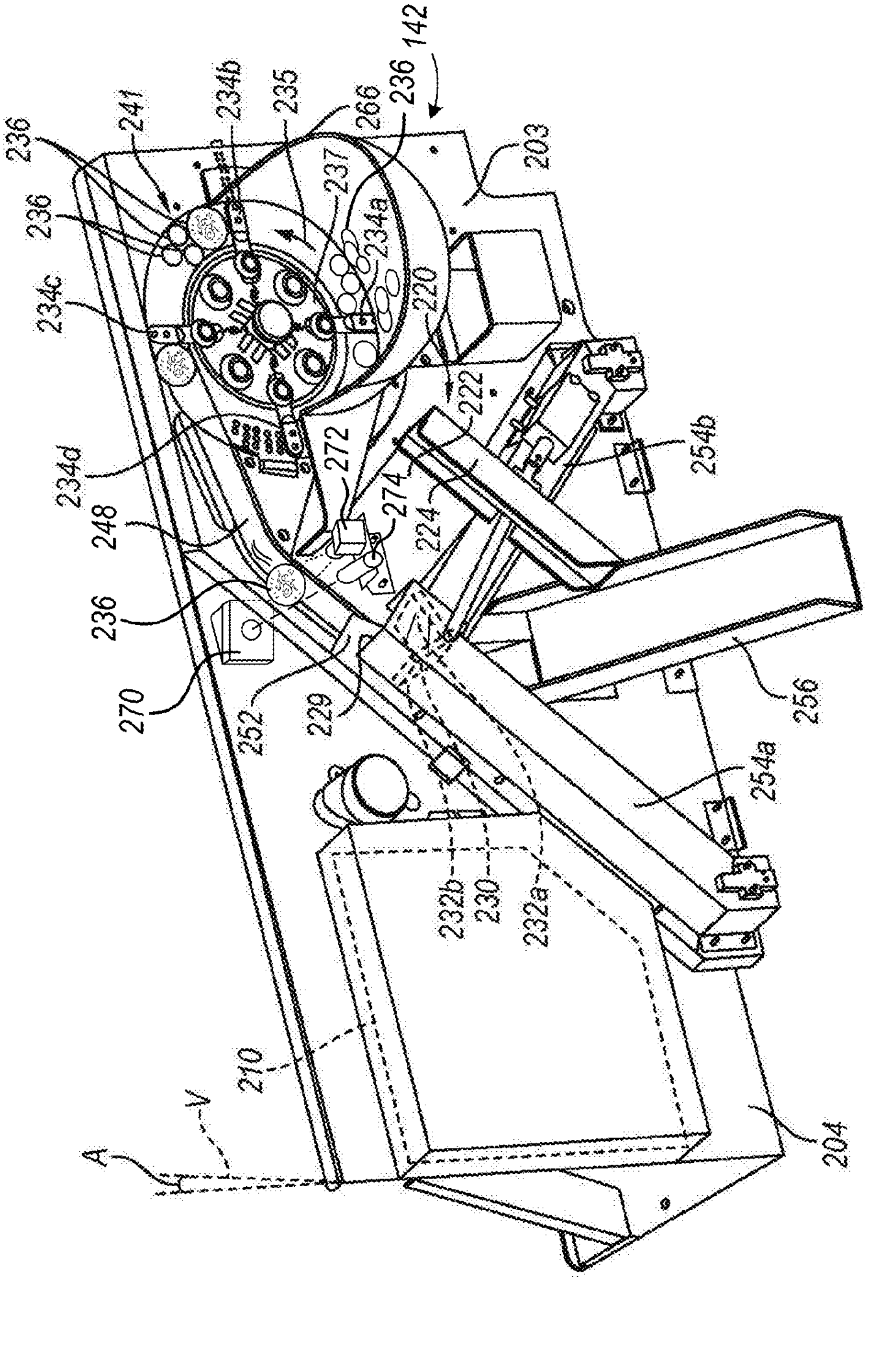
FIG. 2 is an enlarged front isometric view of a coin counting system of the kiosk of FIGS. 1A and 1B.

FIG. 2 is an enlarged isometric view of the coin counting portion 142 of the coin counting machine 100 of FIG. 1B illustrating certain features in more detail. Certain components of the coin counting portion 142 can be at least generally similar in structure and function to the corresponding components described in U.S. Pat. No. 7,520,374. The coin counting portion 142 includes a base plate 203 mounted on a chassis 204. The base plate 203 can be disposed at an angle A with respect to a vertical line V from about 0° to about 15°. A circuit board 210 for controlling operation of various coin counting components can be mounted on the chassis 204.

The illustrated embodiment of the coin counting portion 142 further includes a coin pickup assembly 241 having a rotating disk 237 disposed in the hopper 266 and a plurality of paddles 234*a*-234*d*. The coin rail 248 extends outwardly from the disk 237, past a sensor assembly having a source of light 274 and a detector 270, a digital camera 272, and further toward a chute inlet 229. A bypass chute 220 includes a deflector plane 222 configured to deliver oversized coins to the return chute 256. A diverting door 252 is disposed proximate the chute entrance 229 and is configured to selectively direct discriminated coins toward coin tubes 254*a-b*. A flapper 230 is operable between a first position 232*a* and a second position 232*b* to selectively direct coins to the first delivery tube 254*a* or the second delivery tube 254*b*, respectively.

In operation of the coin counting portion 142, the rotating disk 237 rotates in the direction of arrow 235, causing the paddles 234 to lift individual coins 236 from the hopper 266 and place them on the rail 248. The angle A encourages coins 236 to lay flat against the rail, such that the face of a given coin is generally parallel with the base plate 203. The coins 236 travel along the rail and pass the digital camera 272. Coins that are larger than a preselected size parameter (e.g., a certain diameter) are directed to the deflector plane 222, into a trough 224, and then to the return chute 256. Coins within the acceptable size parameters pass through the digital image acquisition system described below with reference to FIG. 3. The associated software determines if the coin is one of a group of acceptable coins and, if so, the coin denomination is counted.

The majority of undesirable foreign objects (dirt, non-coin objects, etc.) are separated from the coin counting process by the trommel 140 or the deflector plane 222. However, coins or foreign objects of similar characteristics to desired coins are not separated and can pass through the coin sensor (described below with reference to FIG. 3). The coin sensor and the diverting door 252 operate to prevent unacceptable coins (e.g., foreign coins, fraudulent coins, etc.), blanks, or other similar objects from entering the coin tubes 254 and being kept in the machine 100. Specifically, in the illustrated embodiment, the coin sensor determines if an object passing through the sensor is a desired coin, and if so, the desired coin is "kicked" by the diverting door 252 toward the chute inlet 229. The flapper 230 is positioned to direct the kicked coin to one of the coin chutes 254. Coins that are not of a desired denomination, or are foreign or fraudulent coins, continue past the coin sensor to the return chute 256.

Figure 3:
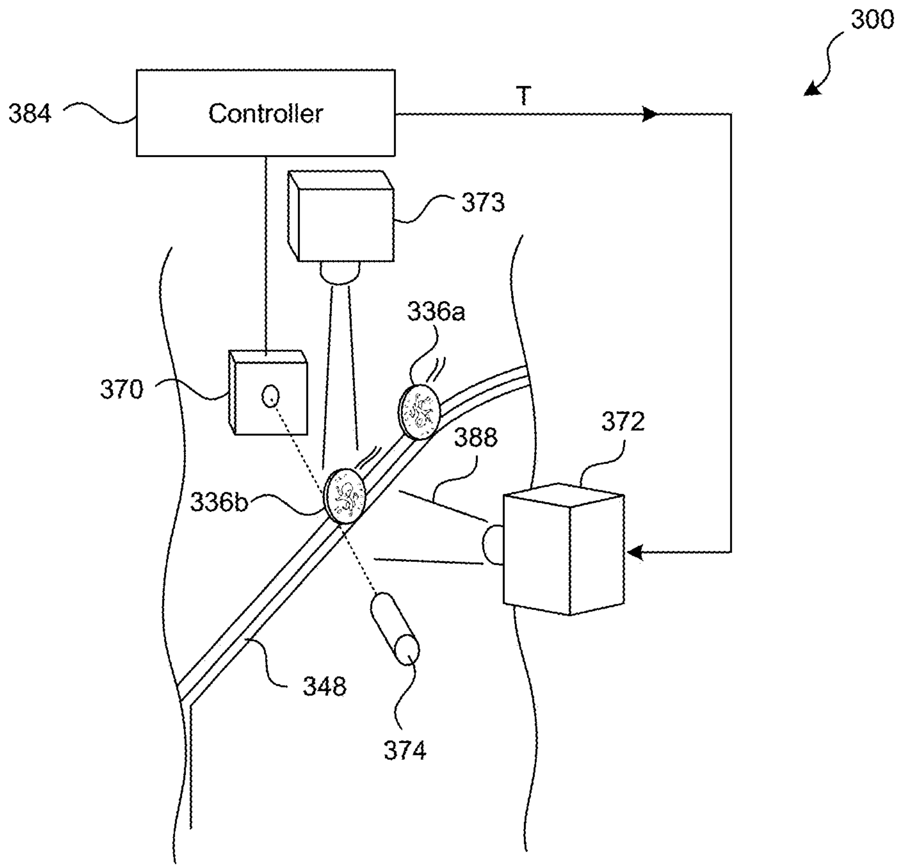
FIG. 3 is a schematic view of a digital image acquisition system configured in accordance with an embodiment of the present technology.

FIG. 3 is a partially schematic isometric view of a digital image acquisition system 300 configured in accordance with an embodiment of the present technology. In the illustrated embodiment, coins 336*a* and 336*b* can be placed on a rail 348 by a mechanism similar to the coin pickup assembly 241 described above in reference to FIG. 2. A radiation source 374 can direct electromagnetic radiation, for example visible or infrared light, toward a detector 370. The detector 370 can be a photo-detector that is sensitive to electromagnetic waves emitted by the radiation source 374. When the electromagnetic radiation from the radiation source 374 reaches the detector 370, a first value of output is sent to a controller 384. When a coin that rolls down the rail 348 interrupts the electromagnetic radiation received by the detector 370, the detector 370 transmits a second value of output to the controller 384 which, in turn, triggers a signal T to digital cameras 372 and/or 373. Upon receiving the trigger signal T, the digital cameras 372, 373 acquire digital images of the coin rolling on the rail 348. Images can have different pixel resolutions including, for example, 480×640 pixel resolution. In other embodiments, other triggering mechanisms may be used, for example electrical switches positioned in or proximate to the path of a rolling coin. In at least some embodiments, a series of images of the same coin can be obtained using a high speed digital camera. In some embodiments, the triggering mechanism may not be needed. Instead, the camera can be configured to run at certain frame acquisition rate. Some of the acquired frames can be selected for further processing by a software algorithm capable of determining that a coin image is in the frame.

Figure 4A:
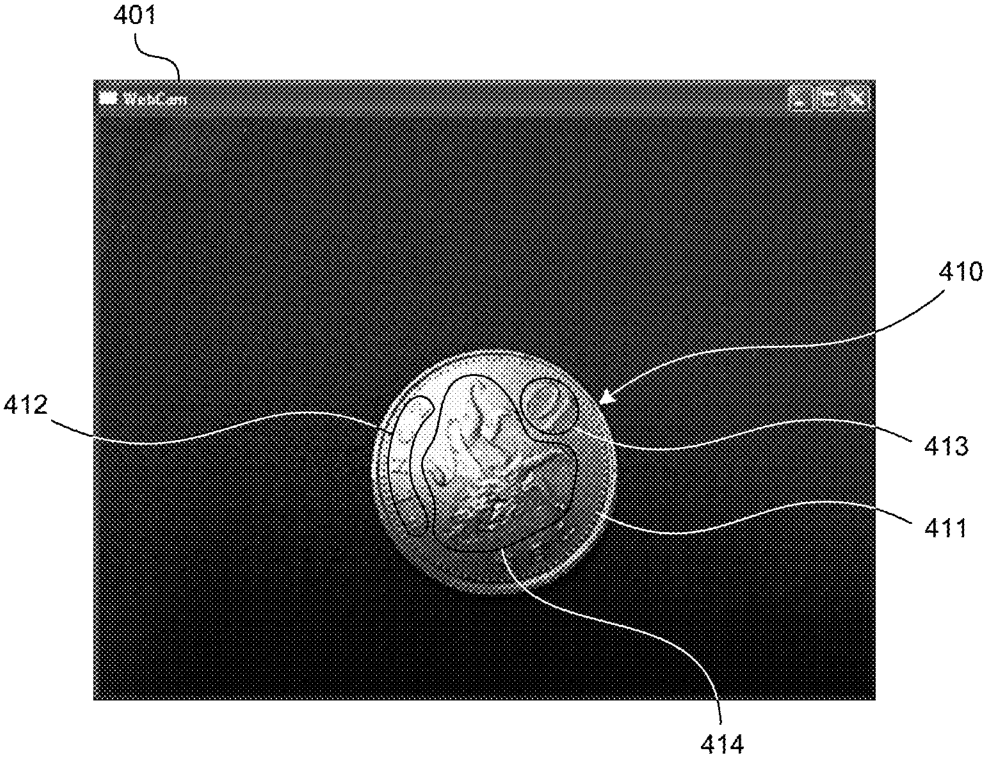
FIG. 4A is a sample image of a coin acquired in accordance with an embodiment of the present technology.

FIG. 4A is a sample digital image 401 of a coin 410. The digital image 401 can be obtained using, for example, the digital image acquisition system shown in FIG. 3. In the embodiment shown in FIG. 4A, the background of the coin 410 is much darker than the coin itself, but other backgrounds are also possible. Background subtraction may be used to depict arbitrary background features. The sample digital image 401 may be a gray image, or a color image which may be converted to a gray image before further processing. The digital image 410 has several aspects that can be used for coin discrimination including, for example, dots 411 around the edge of the coin. For example, the size of the dots 411, their mutual separation, and their distance from the outer edge of the coin 410 vary among coin denominations, and can be used to discriminate the coin 410. Furthermore, lettering 412 and numbers 413 also vary for different coin denominations. Additionally, a centrally located image 414 (of, e.g., a lion) may include several aspects that are useful for coin discrimination, as explained in more detail below. Another aspect for discriminating the coin 410 may be the diameter of the coin. While it is possible to determine a diameter of the coin 410 directly from the digital image, a more robust or accurate diameter determination can be achieved using computer implemented edge detection algorithms known in the art. Such edge detection methods include, for example, Canny, Hough, Marr-Hildreth, Deriche, and Phase Congruency edge detection methods, as explained in more detail below with reference to FIG. 4B.

Figure 4B:
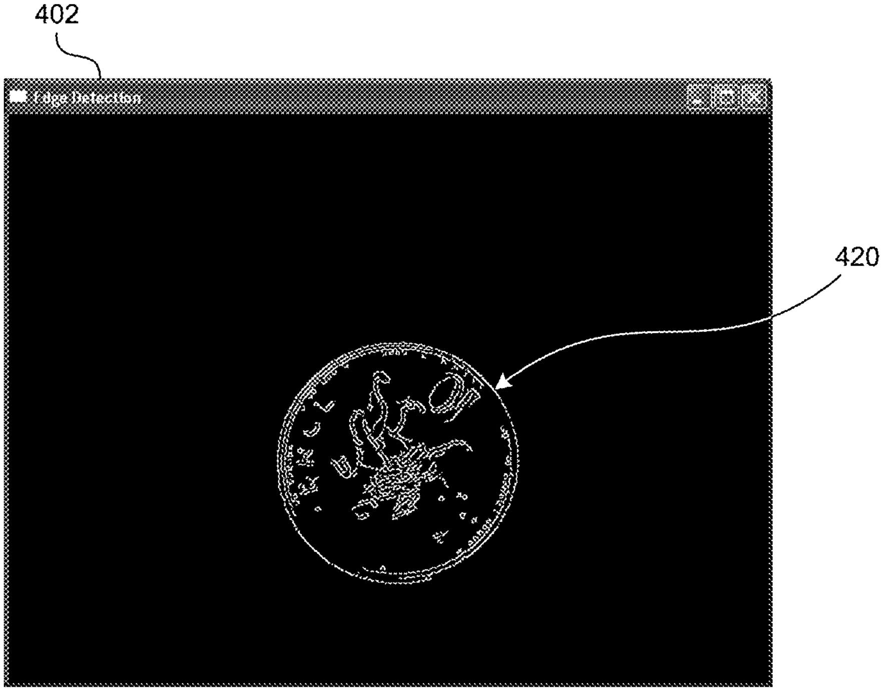
FIG. 4B is a sample coin image of FIG. 4A after implementing edge detection in accordance with an embodiment of the present technology.

FIG. 4B shows an image 402 that was generated by executing a Canny edge detection algorithm on the digital image 401 of FIG. 4A. The Canny edge detection method of this embodiment calculates intensity gradients between the neighboring pixels in the image. Large intensity gradients are more likely to correspond to edges than small intensity gradients. In most cases, it is difficult to specify a threshold a-priori at which a given intensity gradient corresponds to an edge. Therefore, the Canny edge detection method makes an assumption that important edges should align along continuous curves in the image. This assumption promotes constructions of a continuous line, while discarding noisy pixels that produce large gradients but do not constitute the continuous line. Other refinements of the basic Canny edge detection method are known in the art. For example, a second or a third derivative of the neighboring pixel intensities can be used to improve the detection results.

In some embodiments, the digital image 402 can be pre-processed by artificially introducing a broad band noise (i.e., a Gaussian noise) to the image which, in turn, reduces the occurrence of the false-positive edge detections. The detected edges can be represented in a binary image, for example the image 402, where each pixel in the image has an intensity of either an edge pixel (e.g., high) or a non-edge pixel (e.g., low). Therefore, the detected edges can be represented as lines having high pixel intensity against a background at low pixel intensity. Various suitable computer programs that perform Canny edge detection methods are available in the public domain. For example, cv::Canny algorithm in the OpenCV computer vision library can be used. Once the edges on the coin surface are determined using a suitable edge detection algorithm, different aspects of the coin can be located more precisely.

Figure 5:
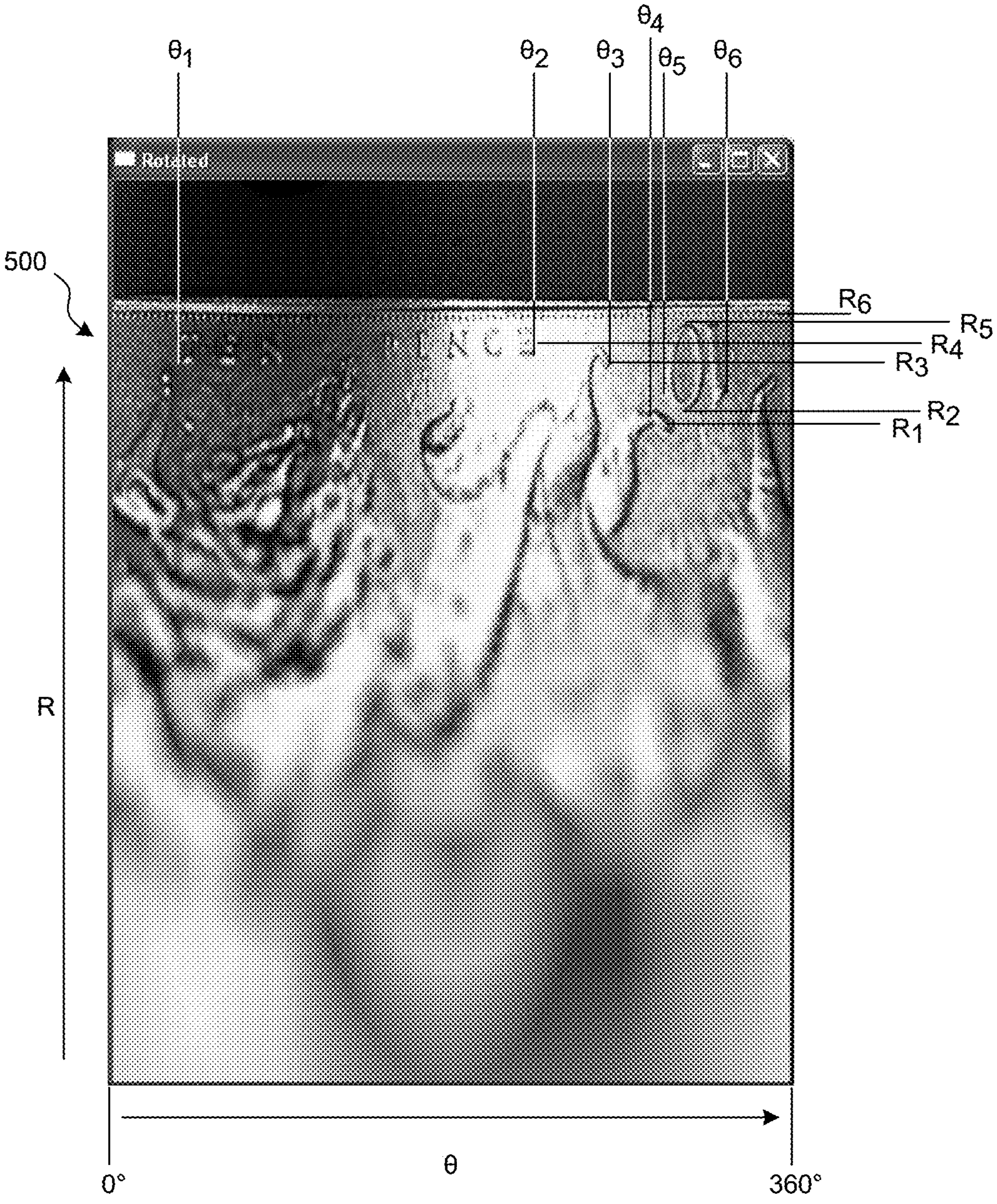
FIG. 5 illustrates several coin aspects in a log-polar coin image of the coin from FIGS. 4A and 4B.

For various coin denominations, the dots along the coin edge, lettering, numbering, and images (see, e.g., 411, 412, 413 and 414 respectively; FIG. 4A) stamped on the coins can also contain distinct aspects. However, the processing of a generally round object within a rectangular digital image can be difficult. Therefore, in at least some embodiments of the present technology, a round digital image of the coin 410 can be transformed to a rectangular image, which is better suited for the subsequent processing leading to determining coin denomination. FIG. 5, for example, illustrates an embodiment of a transformed image 500 of the coin 410 as shown in FIG. 4A. The transformed image 500 can be generated by, for example, a computer implementation of a log-polar transform as in Equation 1 below:

$$R = \log\sqrt{x^2 + y^2} \qquad \text{(Equation 1)}$$
$$\Theta = \arctan\frac{y}{x}$$

where x and y are the locations of the pixels relative to the center of the coin in the digital image shown in FIG. 4. By applying Equation 1, the pixels from the image in FIG. 4A are rearranged into the rectangular image 500 shown in FIG. 5. The horizontal axis of the image 500 corresponds to different θ values on the coin, ranging from 0° to 360° (0 to 2π). Thus, the range from the minimum) (θ=0° to the maximum)(θ=360°) on the horizontal axis θ of FIG. 5 corresponds to the full circumference of the coin. The vertical axis R is a logarithm of the distance in mm from the center of the coin. For example, the words "TEN PENCE," which are at a same radial distance from the center of the coin 410 in FIG. 4A, appear at the same vertical axis R (i.e., R4) in the R-θ graph of FIG. 5. In some embodiments, a generally horizontal orientation of the alphanumerical characters makes the optical character recognition (OCR) easier and/or faster. A computer implemented OCR algorithm can recognize the text "TEN PENCE" in the transformed image 500, and the text can be compared to tabulated values for known coins in a relevant market. In some embodiments, a location of the text "TEN PENCE" can also be used as a criteria for coin discrimination, in addition to or in lieu of the text itself. Other alphanumerical aspects, for example number "10," can be recognized by an OCR algorithm and used to discriminate coins.

Furthermore, locations of and distance among coin aspects and features can be determined using the transformed image 500 in FIG. 5. For example, in the image 414 of the lion shown in FIG. 4A, the locations of the lion's feet can be determined by identifying the lines that encompass relatively small areas that, in turn, are connected to a larger object (e.g., the body of the lion). Once the locations of the lion's feet are known (e.g., ($R_3$, $\theta_3$) and ($R_1$, $\theta_4$)), a distance between the feet can be determined using computer implemented image processing algorithms known to a person of ordinary skill in the art. Accordingly, the location of the physical coin features of interest and/or their distances from one another can be used for coin discrimination.

Additionally, the overall richness of the aspects of the coin image 500 in FIG. 5 is generally different at different locations of the image. Therefore, a spectral analysis of the rectangular image 500 of FIG. 5 produces generally different results per different pixel rows or columns. The spectral analysis can be performed using, for example, a Fourier transform, which maps the pixel values at a given row R (or a group of rows R) into a 2D space having a 1/θ as one dimension and Amplitude in decibels (dB) or linear scale as the second dimension. The Fourier transform can be implemented using digital or analog computers. Other types of suitable spectral transforms known to a person skilled in the art can also be used including, for example, Z-transforms and wavelet transforms.

Figure 6A:
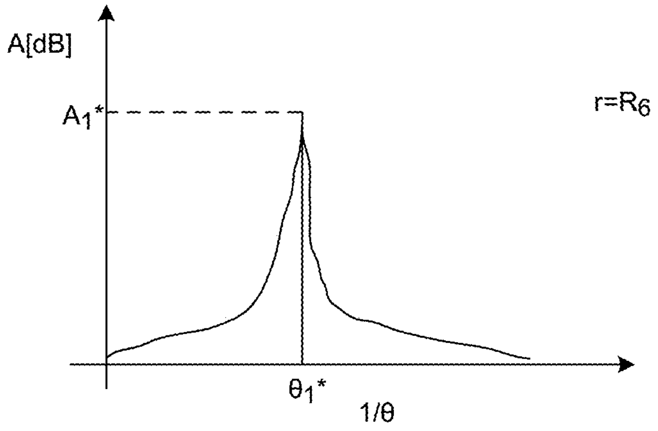
FIGS. 6A and 6B illustrate results of a spectral analysis performed in accordance with an embodiment of the present technology on the coin image from FIG. 5.
Figure 6B:
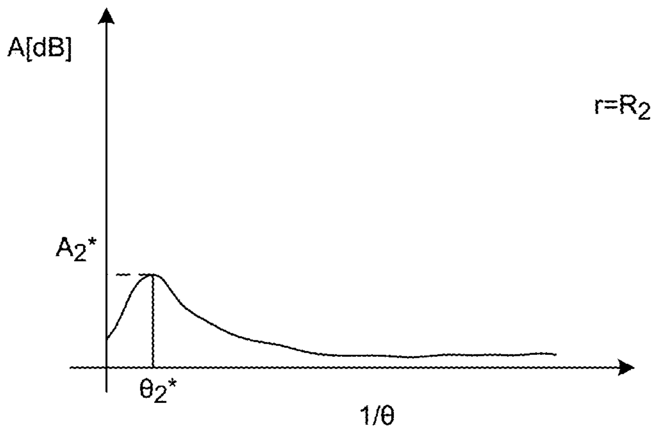

FIGS. 6A and 6B illustrate results of a spectral analysis performed in accordance with embodiments of the present technology on the coin image 500 from FIG. 5. In the graphs shown in FIGS. 6A and 6B, the horizontal axis represents 1/θ and the vertical axis corresponds to the value of spectral amplitude A for the corresponding value of 1/θ. The log-polar transform in Equation 1 discussed above maps the circumferentially located dots 411 in FIG. 4A to a constant R location in FIG. 5 (i.e., $R_3$). FIG. 6A illustrates the spectrum of the coin image along the dots. Because of relatively high regularity of the dots along the row, the corresponding spectral peak ($A_1$*) in the graph in FIG. 6A is localized at a relatively distinct 1/θ (e.g., $\theta_1$*) value. Additionally, due to the high differences in the pixel intensity values between the dots and their surroundings, the spectral peak is also relatively high (e.g., $A_1$*).

FIG. 6B illustrates the spectrum of the coin image 500 along a representative location $R=R_1$ in the rectangular image of FIG. 5. At location $R_1$, the size of the coin aspects and their mutual distances are not as uniform as they are along the dots at the edge of the coin. Therefore, the spectral peak $A_2$* in the graph of FIG. 6B is lower and broader (i.e., encompasses more 1/θ values) in comparison to the spectral graph of FIG. 6A. Furthermore, relatively larger distances between the dominant coin aspects at $R=R_1$ shifts the spectral peak ($A_2$*) toward smaller 1/θ values of the horizontal axis. Since the intensity and/or location of the spectral peaks in the graphs corresponds to the coin aspects for particular locations in the rectangular image of FIG. 5, the graphs in FIGS. 6A and 6B can be used as additional aspects for coin discrimination in accordance with embodiment of the present technology.

Figure 7:
FIG. 7 is a sample one-dollar coin image having several coin identification aspects in accordance with embodiments of the present technology.

FIG. 7 is an image 700 of a sample one-dollar coin having several coin features or aspects in accordance with embodiments of the present technology. In some embodiments, the coin image 700 can be transformed to a line image using, for example, a Canny edge detection method as explained above in reference to FIG. 4B, and then the line image can be used for further processing. In some embodiments of the present technology, flat areas 720, 721, and/or 722 can be used for coin discrimination. The flat areas can be detected by, for example, using a digital computer to identify the areas of the coin that are relatively free of lines and/or other features. The shape of the outline or periphery of one or more of the flat areas can be compared to tabulated shapes for known coins to discriminate the coin. In some embodiments, the location, shape and/or mutual distances of the stars 731 can also be identified and compared with tabulated values for known coins in the relevant market. Other relatively well defined aspects of the coin image can be used to discriminate a coin, for example, the locations and mutual distances among the tips 710 of the wing. In some embodiments, coin discrimination based on these coin aspects can be combined with the spectral analysis described with respect to FIGS. 6A and 6B.

Figure 8A:
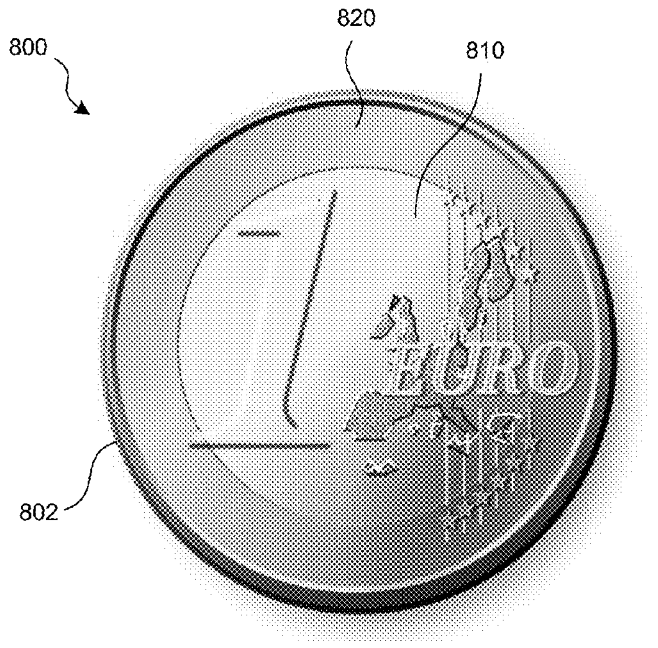
FIGS. 8A and 8B are sample one-Euro coin images having several coin identification aspects in accordance with embodiments of the present technology.
Figure 8B:
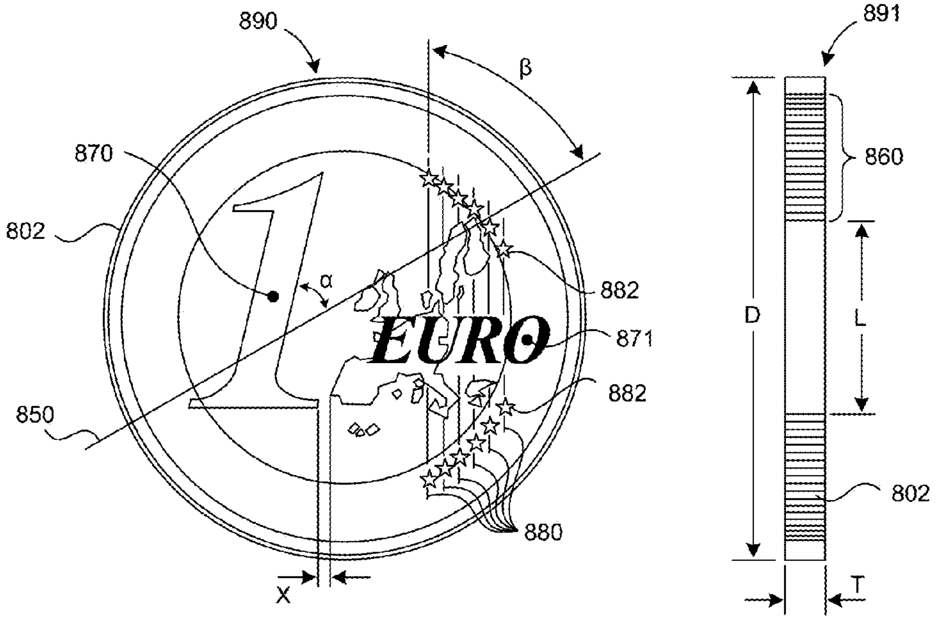

FIGS. 8A and 8B are sample images of a one-Euro coin 800, 890 having several coin identification aspects in accordance with embodiments of the present technology. A coin image 800 in FIG. 8A includes a first area 810 (e.g., a central area) having a first color and/or reflective property, and a second area 820 (e.g., an annular area at a periphery of the coin) having a second color and/or reflective property. In some embodiments of the present technology, differences in color and reflectivity of the areas in the image of the coin can be detected by, for example, computer implemented pixel value thresholding algorithm that assigns a predetermined color to the pixels when the range of pixel intensities falls within a prescribed range. The sensitivity of the pixel value thresholding can be tuned by adjusting the acceptable range of pixel intensities. The color and/or reflective properties of the areas 810 and 820 can be compared to tabulated values for known coins to discriminate the coins in accordance with the preset technology.

FIG. 8B shows a plan view 890 and a side view 891 of the sample one-Euro coin 802. The views 890 and 891 may be obtained using, for example, the digital cameras 372 and 373 described in detail above with reference to FIG. 3, and then transformed to line images using, for example, the Canny edge detection algorithm described above with reference to FIG. 4B. The line image in the plan view 890 can be digitally rotated (e.g., through a computer implemented routine) such that lines 880 extend through features 882 in a desired orientation, for example, in a generally vertical orientation. In some embodiments of the present technology, a line 850 can be added to the view 890. For example, the line 850 can be constructed such that it passes through a center of the view 890 at an angle β with respect to the lines 880. The line 850 may intersect selected features of the view 890. For instance, the illustrated line 850 intersects a long axis of the number "1" at an angle α. A person skilled in the art would know techniques such as using MatLab algorithms for measuring the angle between the line 850 and the long axis of the number "1". In some embodiments of the present technology, the angle α between the illustrated line 850 and the long axis of the number "1" can be feature or aspect used to discriminate the coin 802. Furthermore, distances between the edges in the line image can be calculated including, for example distance X between a foot of number "1" and the nearest point in an outline of the EU membership states (or some other predetermined point). Other aspects in the view 890, for example, a center 871 of the letter "O" in the word EURO and/or a center 870 of the number "1" can also be used to discriminate the coin, either alone or in conjunction with other coin aspects.

The line image of the coin 802 shown in the side view 891 shows two groups of serration lines 860 that are separated by a distance L. In some embodiments, the number of the serration lines can be determined by a computer and used as an aspect to discriminate the coin. Furthermore, a diameter D and a thickness T can also be used as aspects to discriminate the coin. In some embodiments, the coin aspects can be combined and a voting scheme can be established to discriminate the coin against known coins in the market.

From the foregoing, it will be appreciated that specific embodiments of the invention have been described herein for purposes of illustration, but that various modifications may be made without deviating from the spirit and scope of the various embodiments of the invention. Many of the embodiments of the invention can be implemented using, inter alia, a general purpose digital computer having a processor or an industrial controller having a processor. Additionally, the methods explained with reference to FIGS. 1A-8B above can be combined with the prior art methods based on the mass and metallurgy of the coin. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

I claim:

1. A computer-implemented method for identifying coins, the method comprising:
- obtaining a first digital image of a coin with a camera;
- generating a second digital image from the first digital image, wherein the second digital image is a line image;
- identifying at least one edge in the second digital image;
- adding an image of a line to the second digital image;
- determining an angle between the at least one edge and the image of the line; and
- discriminating the coin by comparing the angle to a stored property of a coin.

2. The method of claim 1 wherein the image of the line and the at least one edge intersect.

3. The method of claim 1, further comprising:
- rotating the second digital image.

4. The method of claim 1 wherein the stored property of a coin is a first stored property of a coin, the method further comprising:
- detecting at least two aspects in the second digital image;
- calculating a distance between the at least two aspects; and
- discriminating the coin by comparing the distance to a second stored property of a coin.

5. The method of claim 1 wherein the stored property of a coin is a first stored property of a coin, the method further comprising:
- selecting a plurality of aspects in the second digital image;
- counting a number of aspects; and
- discriminating the coin by comparing the number to a second stored property of a coin.

6. A consumer operated coin counting system comprising:
- a coin input region configured to receive a plurality of coins;
- a digital camera configured to capture a first digital image of at least one coin of the plurality of coins;
- a processor configured to:
  - generate a second digital image from the first digital image, wherein the second digital image is a line image,
  - identify at least one edge in the second digital image,
  - apply an image of a line to the second digital image, and
  - determine an angle between the at least one edge in the second digital image and the image of the line; and
  - discriminate the at least one coin by comparing the angle to a stored property of a coin.

7. The system of claim 6 wherein the stored property of a coin is a first stored property of a coin, the processor further configured to:
- identify aspects in the first digital image;
- determine a distance between the aspects; and
- discriminate the at least one coin by comparing the distance to a second stored property of a coin.

8. The system of claim 6 wherein the stored property of a coin is a first stored property of a coin, the processor further configured to:
- determine a separation between serrated lines along an edge of the at least one coin; and
- discriminate the at least one coin by comparing the separation to a second stored property of a coin.

9. The system of claim 6 wherein the processor is further configured to convert individual first digital images to individual gray scale images.

10. The system of claim 6 wherein the processor is further configured to determine a diameter of the coin.

11. The system of claim 6 wherein the stored property of a coin is a first stored property of a coin, the processor further configured to:
- generate third digital images from the second digital images using a log-polar mapping;
- apply a Fourier-transform on the third digital images; and
- discriminate the coin by comparing results of the Fourier-transform to a second stored property of a coin.

12. A processor configured to implement a method comprising:
- receiving a first digital image of a coin from a camera;
- generating a second digital image from the first digital image;
- identifying at least one edge in the second digital image;
- adding an image of a line to the second digital image;
- determining an angle between the at least one edge and the image of the line; and
- discriminating the coin by comparing the angle to a stored property of a coin.

13. The processor of claim 12 wherein the image of the line and the at least one edge intersect.

14. The processor of claim 12 wherein the method further comprises:
- rotating the second digital image.

15. The processor of claim 12 wherein the stored property of a coin is a first stored property of a coin, and wherein the method further comprises:
- detecting at least two aspects in the second digital image;
- calculating a distance between the at least two aspects; and
- discriminating the coin by comparing the distance to a second stored property of a coin.

* * * * *